United States Patent

Chang

[11] 3,900,472
[45] Aug. 19, 1975

[54] ANTHRAQUINONE DYES CONTAINING A 2-ARYLOXY ALKOXY CARBAMATE MOIETY, THEIR INTERMEDIATES, AND A PROCESS FOR THEIR PREPARATION

[75] Inventor: Charles H. Chang, Piscataway, N.J.

[73] Assignee: GAF Corporation, New York, N.Y.

[22] Filed: Dec. 20, 1971

[21] Appl. No.: 210,109

[52] U.S. Cl............... 260/247.1 A; 260/247.2 B; 260/268 TR; 260/272; 260/293.62; 260/326.4; 260/372; 260/377
[51] Int. Cl............................................ C07d 87/46
[58] Field of Search........ 260/377, 247.1 A, 293.62, 260/326–347, 268 TR, 247.2 B, 326.4, 272

[56] References Cited
UNITED STATES PATENTS
3,349,104  10/1967  Lodge................................. 260/377
3,379,738   4/1968  Wallace et al...................... 260/377
3,636,065   1/1972  Guye-Vuilleme.................... 260/377

FOREIGN PATENTS OR APPLICATIONS
1,570,934   5/1969   France

*Primary Examiner*—Donald G Daus
*Assistant Examiner*—Jose Tovar
*Attorney, Agent, or Firm*—Walter C. Kehm

[57] ABSTRACT

New dyestuff compounds having the structure

I.

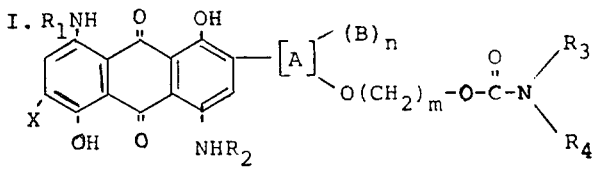

in which A is a monocyclic, bicyclic or tricyclic aryl radical; B is halogen, lower alkyl, lower alkylmercapto, amino, lower alkylamino, di-lower alkylamino or phenylamino, $n$ is an integer of from 0 to 4; each of $R_1$, $R_2$, $R_3$ and $R_4$ is hydrogen lower alkyl, cycloalkyl or phenyl; alternatively, $R_3$ and $R_4$ taken together with the nitrogen atom to which they are attached may be a 5 or 6 membered heterocyclic ring optionally interrupted by oxygen or another nitrogen atom; X is $SO_3H$ or hydrogen; and $m$ is an integer of from 1 to 4. The new compounds in which X is $SO_3H$ are prepared by reacting an anthrarufindisulfonic acid of the formula

II.

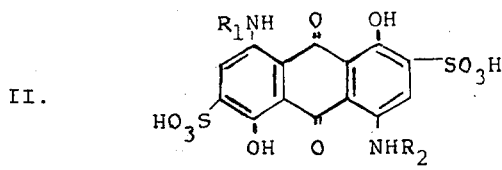

with a new intermediate aryloxy alkoxy carbamate compound of the formula

III.

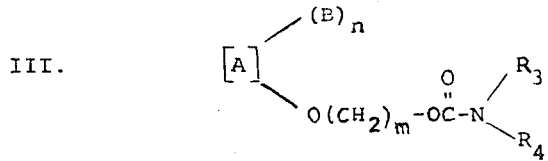

in the presence of boric and concentrated sulfuric acids, treating the reaction mixture with ammonium hydroxide, and subsequent acidification. Compounds in which X is hydrogen are prepared from compounds of Formula I ($X=SO_3H$) by treatment with sodium hydrosulfide. The new anthraquinone compounds of this invention are useful for dyeing synthetic fibers such as polyester, polyamide, acetate or triacetate.

16 Claims, No Drawings

ANTHRAQUINONE DYES CONTAINING A 2-ARYLOXY ALKOXY CARBAMATE MOIETY, THEIR INTERMEDIATES, AND A PROCESS FOR THEIR PREPARATION

This invention relates to new anthraquinone dyestuffs, to a new process for their preparation, and to their use as dyes for various synthetic fibers. It also relates to new intermediates used in the manufacture of these dyestuffs.

1,5-dihydroxy-4,8-diamino-2(p-alkoxyphenyl)anthraquinones are disclosed in U.S. Pat. No. 1,652,584 as being dyestuffs. The use of these compounds as dyestuffs for snythetic fibers was more recently disclosed in U.S. Pat. Nos. 3,265,460 and 3,043,646. These compounds have very satisfactory heat fastness and, in general, possess very desirable dyeing properties. Though these anthraquinone dyestuffs have good light, heat and washing fastness properties as compaared with other known anthraquinone blue dyestuffs, the requirements for modern dyestuffs, due to more severe textile processing conditions encountered in imparting durable press properties to textiles, result in much higher standards than were previously necessary.

More recently, a new class of anthraquinone dyestuffs containing an N-monosubstituted urethane moiety on the 2-phenyl group was disclosed in British Patent Specification No. 1,156,125. These anthraquinone dyes were prepared from the reaction the corresponding 2-(p-hydroxyphenyl) anthrarufin derivatives with organic isocyanates. The patent, however, was devoid of any teaching of anthraquinones containing an N,N-disubstituted urethane moiety or compounds in which the carbamate moiety is not directly linked to the phenyl group.

A new class of anthraquinone dyestuffs has now been discovered which has been shown to possess excellent dyeing properties. These dyestuffs are compounds of the formula:

I

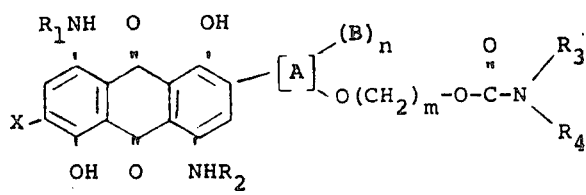

in which A is a monocyclic, bicyclic or tricyclic ayrl radical; B is halogen, lower alkyl, lower alkylmercapto, amino, lower alkylamino, di-lower alkylamino or phenylamino; $n$ is an integer of from 0 to 4; each of $R_1$, $R_2$, $R_3$ and $R_4$ is hydrogen, lower alkyl, cycloalkyl or phenyl; alternatively, $R_3$ and $R_4$ taken together with the nitrogen atom to which they are attached may be a 5 or 6 membered heterocyclic ring optionally interrupted by oxygen or another nitrogen atom; X is $SO_3H$ or hydrogen; and m is an integer of from 2 to 4.

In Formula I, A is peferably phenyl but may also be naphthyl anthracenyl or phenanthryl. The symbol $n$ preferably represents 0 or 1, especially 0. The groups represented by $R_1$, $R_2$, $R_3$, and $R_4$ are preferably hydrogen or lower alkyl, especially hydrogen, methyl and ethyl. $R_3$ and $R_4$ are preferably taken separately but, when taken together form with the nitrogen atom to which they are attached, heterocyclic radicals such as pyrrolidino, piperidino, piperazino and morpholino. The symbol $m$ preferably represents 2.

The term "lower alkyl" when used herein represents alkyl groups having from 1 to 5 carbon atoms, including methyl, ethyl, n-propyl, isopropyl, n-butyl, etc. The term "cycloalkyl" represented saturated cyclic alkyl groups having from 3 to 6 carbon atoms, including cyclopropyl, cyclopentyl, and cyclohexyl.

Compounds of formula I in which X is $SO_3H$ are prepared by reacting the corresponding anthrarufindisulfonic acid derivative of the formula

II

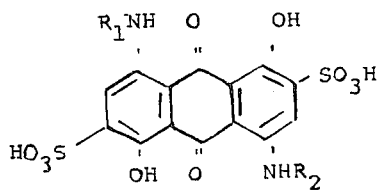

with an aryloxy alkoxy carbamate compound of the formula:

III

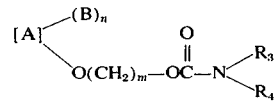

It is essentially a three step reaction. The first step consists of reacting the anthrarufindisulfonic acid and the carbamate compound in a strongly acid medium comprising concentrated sulfuric acid and boric acid. The anthrarufindisulfonic acid and the boric acid are first dissolved in concentrated sulfuric acid; the weight ratio of boric acid to anthrarufindisulfonic acid may range from about 1:1 to about 10:1, preferably from about 2:1 to about 4:1. The carbamate compound is then added to the solution in slight molar excess. The solution is then stirred slowly at a temperature of from about −30°C. to about 20°C., preferably about −10°C.

After this reaction is complete, the mixture is drowned in an aqueous alkali solution at a final pH between about 8.5 and 9.5. Preferably, the pH range should be between about 9.0 and 9.5. Ammonium hydroxide is the preferred reagent for use in this alkalization step, although sodium hydroxide and potassium hydroxide may also be used. After this pH adjustment, the mixture is heated under reflux, for approximately 1 hour, filtered and then washed with water. The resultant product is obtained in good yield.

In order to prepare the new compounds in which X is hydrogen, the sulfonic acid derivative, produced according to the foregoing discussion, is further desulfonated with sodium hydrosulfite. This desulfonation process takes place preferably at a temperature of between about 60°C. to about 90°C. preferably from about 75° to about 85°C. As a result of this third step, a compound of Formula I in which X is hydrogen is obtained in excellent yield.

The fact that compounds of Formula I can be obtained by this process is quite surprising since it would normally be expected that the urethane moiety would be cleaved by the strong acids and alkalis used. The process is specific to the production of 2-aryloxy alkoxy carbamate derivatives. For example, it is possible to prepare 2-phenoxy alkoxy carbamate derivatives of anthraquinone dyes, but attempts to prepare 2-phenoxy carbamate derivatives of these dyes by the same process have not been successful.

The compounds of Formula III are new compounds. They may be conveniently prepared from aryloxy alcohols according to the following reaction scheme, which is illustrative of the preparation of phenoxy ethyl carbamate:

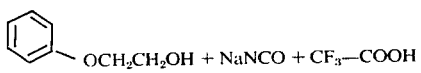

$$\text{C}_6\text{H}_5\text{—OCH}_2\text{CH}_2\text{OH} + \text{NaNCO} + \text{CF}_3\text{—COOH}$$

$$\xrightarrow{\text{H}_2\text{O}} \text{C}_6\text{H}_5\text{—OCH}_2\text{CH}_2\text{—O—}\overset{\overset{\text{O}}{\|}}{\text{C}}\text{—NH}_2$$

Further details, reaction conditions, time, etc., may be found in Fieser and Fieser, "Reagents For Organic Synthesis" 1219 (1967).

Among the specific dyestuff compounds of this invention are those having the following structural formula.

TABLE $$[A] \diagup \begin{matrix} (B)_n \\ O(CH_2)_m\text{—O—}\overset{\overset{O}{\|}}{C}\text{—N} \diagup \begin{matrix} R_3 \\ R_4 \end{matrix} \end{matrix}$$

| No. | X | $R_1$ | $R_2$ | [A] |
|-----|------|--------|--------|------|
| 1   | SO₃H | H | H | —C₆H₄— OCH₂CH₂—OCONHCH₃ |
| 2   | H    |   |   |   |
| 3   | SO₃H | H | CH₃ | —C₆H₄— OCH₂CH₂—OCONHCH₃ |
| 4   | H    |   |   |   |
| 5   | SO₃H | H | H | —C₆H₄— OCH₂CH₂—OCONHC₂H₅ |
| 6   | H    |   |   |   |
| 7   | SO₃H | H | H | —C₆H₄— OCH₂CH₂—OCON(CH₃)₂ |
| 8   | H    |   |   |   |
| 9   | SO₃H | H | H | —C₆H₄— OCH₂CH₂—OCONH₂ |
| 10  | H    |   |   |   |
| 11  | SO₃H | CH₃ | CH₃ | —C₆H₄— OCH₂CH₂—OCONHCH₃ |
| 12  | H    |   |   |   |
| 13  | SO₃H | CH₃ | CH₃ | —C₆H₄— OCH₂CH₂— OCON(CH₃)₂ |
| 14  | H    |   |   |   |
| 15  | SO₃H | H | C₂H₅ | —C₆H₄— OCH₂CH₂—OCONHCH₃ |
| 16  | H    |   |   |   |
| 17  | SO₃H | i—C₃H₇ | H | —C₆H₄— OCH₂CH₂—OCONHCH₃ |
| 18  | H    |   |   |   |
| 19  | SO₃H | n—C₄H₉ | H | —C₆H₄— OCH₂CH₂—OCONHCH₃ |
| 20  | H    |   |   |   |
| 21  | SO₃H | H | H | —C₆H₃(Phenyl)— OCH₂CH₂—OCONHCH₃ |
| 22  | H    |   |   |   |

TABLE – Continued $$[A] \diagup_{O(CH_2)_m - O - \overset{\overset{O}{\|}}{C} - N \diagdown_{R_4}^{R_3}}^{(B)_n}$$

| No. | X | $R_1$ | $R_2$ | [A]–(B)$_n$–O(CH$_2$)$_m$–OCONR$_3$R$_4$ |
|---|---|---|---|---|
| 23 | SO$_3$H | H | CH$_3$ | –C$_6$H$_4$(CH$_3$)–OCH$_2$CH$_2$–OCONHCH$_3$ |
| 24 | H | | | |
| 25 | SO$_3$H | H | H | –C$_6$H$_4$(NHCH$_3$)–OCH$_2$CH$_2$–OCONHCH$_3$ |
| 26 | H | | | |
| 27 | SO$_3$H | H | H | –C$_6$H$_4$(NH(CH$_3$)$_2$)–OCH$_2$CH$_2$–OCONH$_2$ |
| 28 | H | | | |
| 29 | SO$_3$H | H | CH$_3$ | –C$_6$H$_4$(Phenyl)–OCH$_2$CH$_2$OCONHC$_2$H$_5$ |
| 30 | H | | | |
| 31 | SO$_3$H | CH$_3$ | CH$_3$ | –C$_6$H$_4$(CH$_3$)–OCH$_2$CH$_2$–OCONH$_2$ |
| 32 | H | | | |
| 33 | SO$_3$H | Cyclopropyl | H | –C$_6$H$_4$–OCH$_2$CH$_2$–OCONHCH$_3$ |
| 34 | H | | | |
| 35 | SO$_3$H | H | C$_6$H$_5$ | –C$_6$H$_4$–OCH$_2$CH$_2$OCONHCH$_3$ |
| 36 | H | | | |
| 37 | SO$_3$H | Cyclohexyl | H | –C$_6$H$_4$–OCH$_2$CH$_2$OCONHCH$_3$ |
| 38 | H | | | |
| 39 | SO$_3$H | C$_2$H$_5$ | C$_2$H$_5$ | –C$_6$H$_4$–OCH$_2$CH$_2$OCON(CH$_3$)$_2$ |
| 40 | H | | | |
| 41 | SO$_3$H | H | H | –C$_6$H$_4$–OCH$_2$OCONHCH$_3$ |
| 42 | H | | | |
| 43 | SO$_3$H | H | H | –C$_6$H$_4$–OCH$_2$OCON(CH$_3$)$_2$ |
| 44 | H | | | |
| 45 | SO$_3$H | H | CH$_3$ | –C$_6$H$_4$–OCH$_2$OCONH$_2$ |
| 46 | H | | | |
| 47 | SO$_3$H | H | H | –C$_6$H$_4$–OCH$_2$CH$_2$CH$_2$–OCONHCH$_3$ |
| 48 | H | | | |
| 49 | SO$_3$H | H | CH$_3$ | –C$_6$H$_4$–OCH$_2$CH$_2$CH$_2$CH$_2$OCONHCH$_3$ |
| 50 | H | | | |
| 51 | SO$_3$H | H | H | –C$_6$H$_4$–OCH$_2$CH$_2$CH$_2$CH$_2$–OCONH$_2$ |
| 52 | H | | | |
| 53 | SO$_3$H | H | H | –C$_{10}$H$_6$–OCH$_2$CH$_2$–OCONHCH$_3$ (naphthyl) |
| 54 | H | | | |

TABLE – Continued $$[A] \underset{O(CH_2)_m-O-N}{\overset{(B)_n}{<}} \underset{R_4}{\overset{R_3}{<}}$$

| No. | X | R₁ | R₂ | [A] structure |
|-----|-----|-----|-----|-----|
| 55 | SO₃H | H | CH₃ | naphthyl—OCH₂CH₂OCONHCH₃ |
| 56 | H | | | |
| 57 | SO₃H | H | H | anthryl—OCH₂CH₂OCONHCH₃ |
| 58 | H | | | |
| 59 | SO₃H | H | CH₃ | phenyl(SCH₃)—OCH₂CH₂OCONHCH₃ |
| 60 | H | | | |
| 61 | SO₃H | CH₃ | H | phenyl—OCH₂CH₂OCONH₂ |
| 62 | H | | | |
| 63 | SO₃H | H | H | phenyl(Phenyl)—OCH₂CH₂OCONHCH₃ |
| 64 | H | | | |
| 65 | SO₃H | H | H | phenyl—OCH₂CH₂OCON(piperidinyl) |
| 66 | H | | | |
| 67 | SO₃H | H | H | phenyl—OCH₂CH₂OCON(piperazinyl) |
| 68 | H | | | |
| 69 | SO₃H | H | H | phenyl—OCH₂CH₂OCON(pyrrolidinyl) |
| 70 | H | | | |
| 71 | SO₃H | H | H | phenyl—OCH₂CH₂OCON(morpholinyl) |
| 72 | H | | | |

The dyestuffs of the present invention are applied to fibers by forming an intimate mixture of the dyestuff with water and, preferably, a dispersing agent. Suitable dispersing agents are lignosulfonates such as sodium lignosulfonate, naphthalene sulfonic acid-formaldehyde condensation products or cresol-formaldehyde-sodium sulfite condensation products. The dyestuffs are applied to fibers such as polyester, polyamide, acetate, triacetate or polyolefin fibers by immersion of fabrics or yarns prepared from such fibers in an aqueous dispersion of the dyestuffs. The dyeing may be conducted under pressure and at an elevated temperature for time sufficient for the dye to adhere to the fiber, e.g., 5 minutes to 2 hours. The dyebath may contain dye carriers such as trichlorobenzene, or phenphenylphenol or methylnaphthalene. Likewise a small but effective amount of a surface active agent may also be present in the dyebath.

The following examples are presented to illustrate the spirit, but not to limit the scope, of the present invention.

EXAMPLE 1

To a flask containing a mixture of 30 g of 1,5-diamino-4,8 dihydroxy-anthraquinone-3,7-disulfonic acid and 10 g of boric acid dissolved in 180 ml of 96% sulfuric acid, was added to 10°C. in portions 14 g of N-methyl-2-phenoxyethyl carbamate and stirred at 10°C. for 20 minutes. The resulting mixture was drowned to a mixture of 1.5 l. of water (5°C) and 480 ml. of conc. NH₄OH. The alkaline mixture was heated under reflux for three-fourths hour and made acidic with sulfuric acid at 80°C. The mixture was filtered and washed with water at 25°C. to give the product with the following structure:

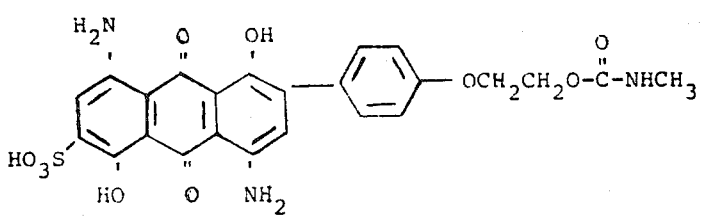

This product dyed nylon and wool in bright blue shade with excellent fastness properties.

EXAMPLE II

The monosulfonic acid anthraquinone prepared in Example I was slurried with 1.5 l. of water heated to 70°C. to which 10 ml. of conc. 40% methylamine and 20 ml. of 50% NaOH were then added to the resulting mixture was added 17 g of sodium hydrosulfite and heated at 85°C. for 1½ hours. The mixture was then made acidic with sulfuric acid at 80°C., filtered and washed with hot water till colorless to give a product which was dispersed and dyed on polyester fibers in bright blue shade with excellent fastness properties. The product consists principally of

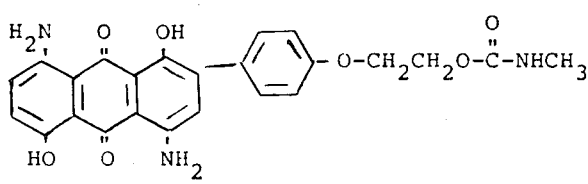

EXAMPLE III

Following the method of Example I using, as reactants, 1-methylamino-5-amino-4,8-dihydroxyanthraquinone-3,7-disulfonic acid and N-methyl-2-phenoxyethyl carbamate, a compound of the following structure was obtained

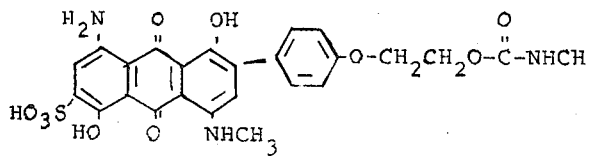

This product dyed nylon and wool in bright blue shades with excellent fastness properties.

EXAMPLE IV

The monosulfonic acid anthraquinone of Example III was treated according to the method described in Example II. The product had the structure

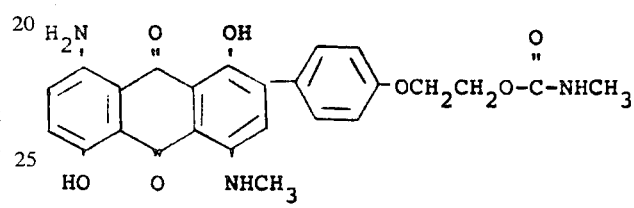

The product was dispersed and dyed on polyester fibers and gave a bright blue shade with excellent fastness properties.

EXAMPLES V and VI

When N-methyl-phenoxyethyl carbamate was replaced by N-ethylphenoxyethyl carbamate in Example I and treated according to the methods taught in Examples I and II, the products are

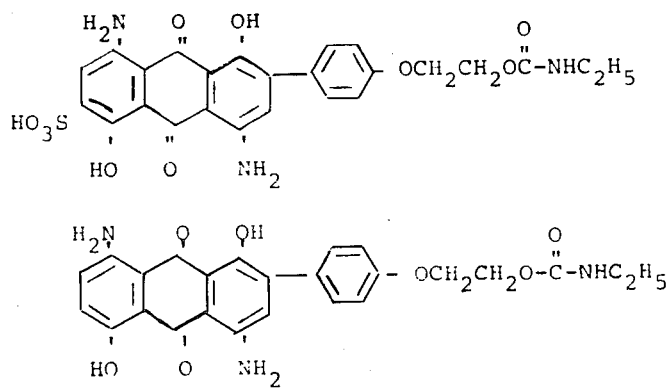

The second product (Example VI) dyed polyester in bright blue shade with good light and sublimation fastness (5870-226)

EXAMPLES VII and VIII

When N,N-dimethyl-phenoxyethyl carbamate was used to replace N-methylphenoxyethyl carbamate in Example I and the procedures of Example I and II were followed and the following dyes were obtained:

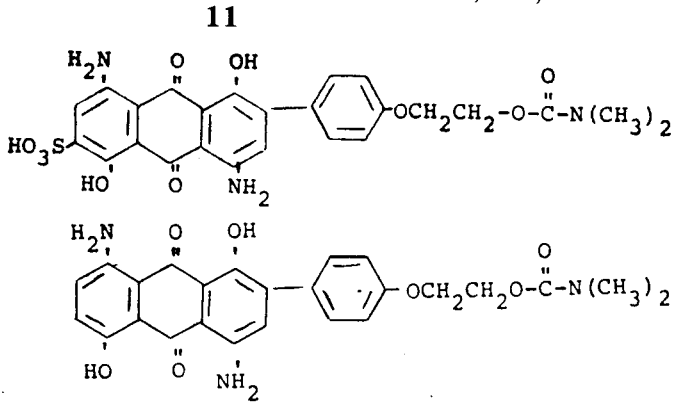

and

EXAMPLES IX and X

When N-methyl phenoxyethyl carbamate in Example I was replaced by phenoxyethyl carbamate and the procedures of Examples I and II were followed, the following dyes were obtained.

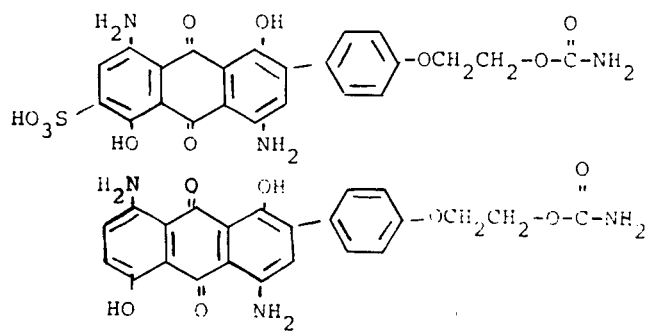

The second product (Example X) dyed polyester in a bright blue shade with good fastness.

EXAMPLES XI and XII

When 16 g of

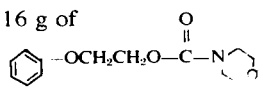

is used instead of the N-methyl-2-phenoxyethyl carbamate in Example I, the following dyes were prepared:

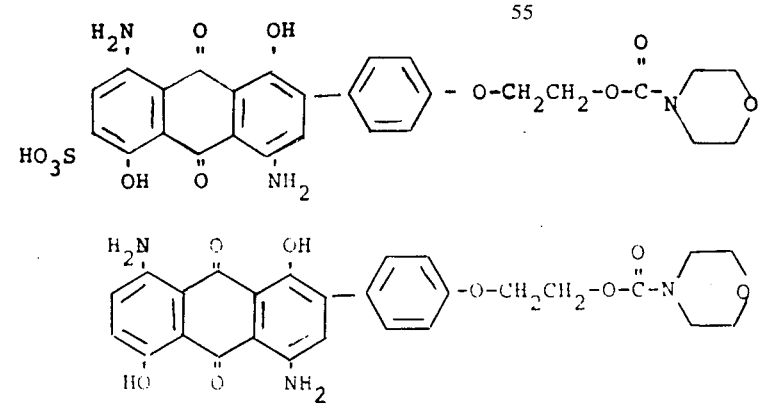

and

What is claimed is:

1. A compound of the formula

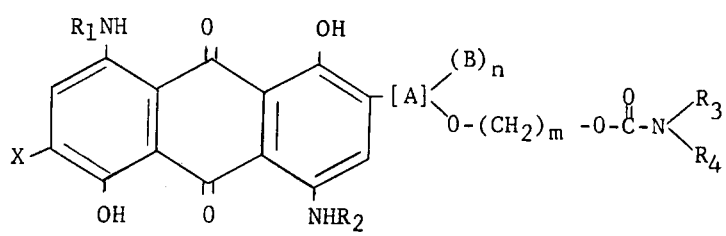

in which A is a phenyl, naphthyl, anthracenyl or phenanthryl radical; B is hydrogen, lower alkyl, lower alkylmercapto, amino, lower alkylamino, di-lower alkyl amino, halogen or phenylamino; n is an integer of from 1 to 4; each of $R_1$, $R_2$, $R_3$, and $R_4$ is hydrogen, lower alkyl, cycloalkyl of 3 to 6 carbon atoms or phenyl; alternatively, $R_3$ and $R_4$ taken together with the nitrogen atom to which they are attached form a heterocyclic ring selected from the group consisting of pyrrolidine, piperidine, piperazine, and morpholine; X is $SO_3H$ or hydrogen; and m is an integer of from 1 to 4.

2. A compound acording to claim 1 having the formula

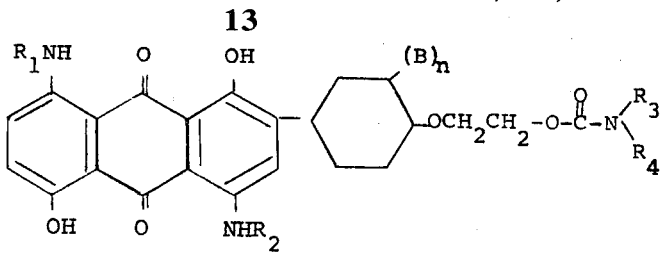

in which each of $R_1$, $R_2$, $R_3$ and $R_4$ is hydrogen or lower alkyl, or $R_3$ and $R_4$ taken together with the nitrogen atom to which they are attached are pyrrolidino, piperidino, piperazino or morpholino; and n is 0 or 1.

3. A compound according to claim 2 having the formula

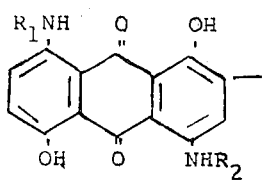

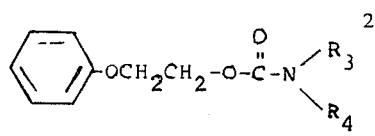

in which each of $R_1$, $R_2$, $R_3$ and $R_4$ is hydrogen or lower alkyl.

4. A compound according to claim 3 which has the formula

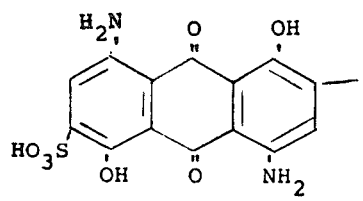

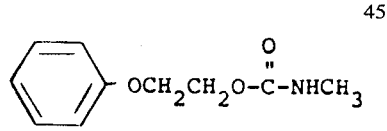

5. A compound according to claim 3 which has the formula

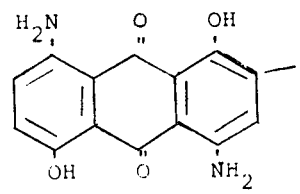

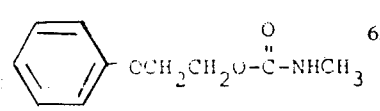

6. A compound according to claim 3 which has the formula

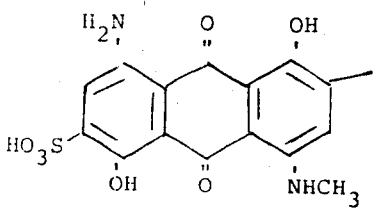

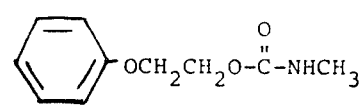

7. A compound according to claim 3 which has the formula

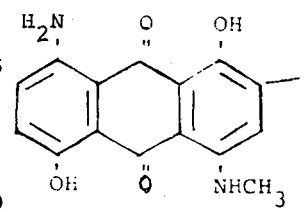

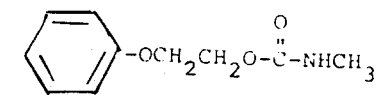

8. A compound according to claim 3 which has the formula

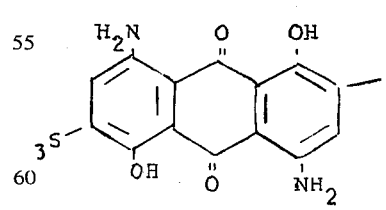

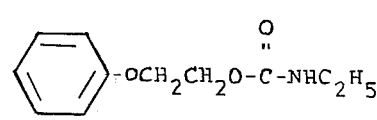

9. A compound according to claim 3 which has the formula

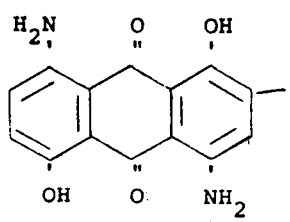

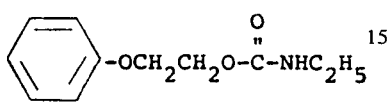

10. A compound according to claim 3 which has the formula

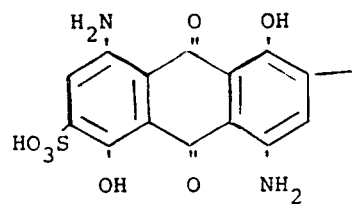

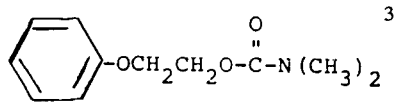

11. A compound according to claim 3 which has the formula

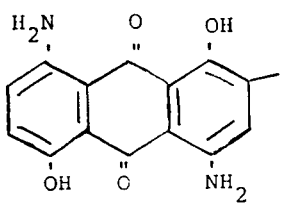

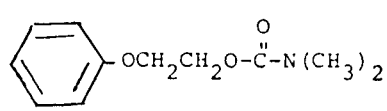

12. A compound according to claim 3 which has the formula

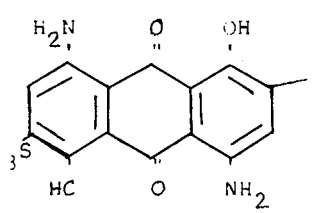

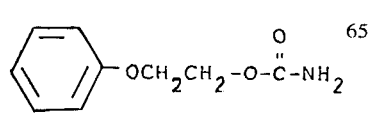

13. A compound according to claim 3 which has the formula

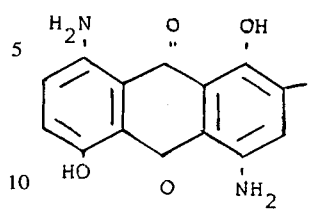

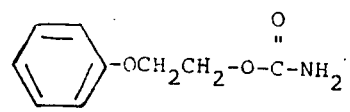

14. A compound according to claim 2 which has the formula

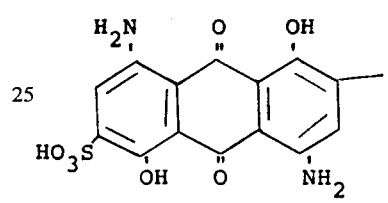

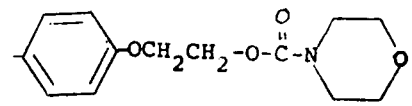

15. A compound according to claim 2 which has the formula

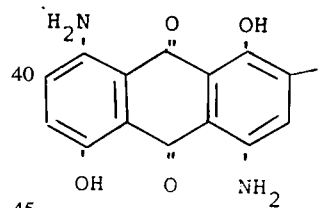

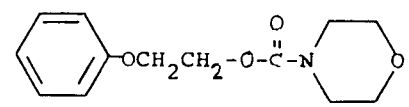

16. A compound of the formula

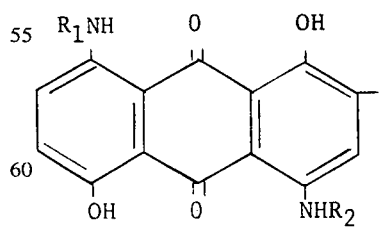

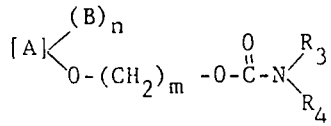

in which A is a phenyl, naphthyl, anthracenyl or phenanthryl radical; B is halogen, lower alkyl, lower alkylmercapto, amino, lower alkylamino, di-lower alkyl amino or phenylamino; $n$ is an integer of from 0 to 4; each of $R_1$, $R_2$, $R_3$ and $R_4$ is hydrogen, lower alkyl, cycloalkyl of 3 to 6 carbon atoms or phenyl; alternatively, $R_3$ and $R_4$, taken together with the nitrogen atom to which they are attached, form a heterocyclic ring selected from the group consisting of pyrrolidine, piperidine, piperazine and morpholine and $m$ is an integer of from 1 to 4.

* * * * *